US008264564B2

(12) United States Patent
Kita

(10) Patent No.: US 8,264,564 B2
(45) Date of Patent: Sep. 11, 2012

(54) IMAGE PICK-UP APPARATUS, METHOD OF PRODUCING FILE OF OBTAINED IMAGE, AND RECORDING MEDIUM

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 385 days.

(21) Appl. No.: 12/579,587

(22) Filed: Oct. 15, 2009

(65) Prior Publication Data

US 2010/0134644 A1  Jun. 3, 2010

(30) Foreign Application Priority Data

Nov. 28, 2008  (JP) ................................ 2008-303913

(51) Int. Cl.
*H04N 5/235*  (2006.01)
(52) U.S. Cl. ................................ 348/222.1; 348/231.99
(58) Field of Classification Search ............... 348/222.1, 348/231.99, 231.2, 231.6
See application file for complete search history.

(56) References Cited

U.S. PATENT DOCUMENTS

| | | | | |
|---|---|---|---|---|
| 2003/0108339 A1* | 6/2003 | Yamagishi | ................ | 386/96 |
| 2006/0262199 A1* | 11/2006 | Takahashi et al. | ......... | 348/231.2 |
| 2007/0013790 A1* | 1/2007 | Nakase | .................. | 348/231.99 |
| 2009/0167873 A1* | 7/2009 | Sakaue et al. | .............. | 348/207.2 |
| 2009/0172011 A1* | 7/2009 | Onomura | ...................... | 707/102 |
| 2009/0207279 A1 | 8/2009 | Ochi et al. | | |

FOREIGN PATENT DOCUMENTS

| | | |
|---|---|---|
| JP | 2000-261756 A | 9/2000 |
| JP | 2006-237757 A | 9/2006 |
| JP | 2006-352229 A | 12/2006 |
| JP | 2008-072682 A | 3/2008 |
| WO | WO 2008/087914 A1 | 7/2008 |

OTHER PUBLICATIONS

Japanese Office Action dated Feb. 15, 2011 (and English translation thereof) in counterpart Japanese Application No. 2008-303913.

* cited by examiner

*Primary Examiner* — Gevell Selby
(74) *Attorney, Agent, or Firm* — Holtz, Holtz, Goodman & Chick, PC

(57) ABSTRACT

Digital camera is provided with an image pick-up unit 24 and a best shot data memory, which stores plural sorts of shooting scenes each associated with one of a first file format and a second file format, wherein the first file format is used for an image file of a single image and the second file format is used for an image file of plural images, when the image file of images obtained in the shooting scenes is produced. When one of the shooting scenes is set, a shooting operation is performed in the set shooting scene to obtain image(s) and an image file of the image or an image file of the images is produced, wherein the image file has the file format corresponding to the set shooting scene.

11 Claims, 8 Drawing Sheets

102

| SHOOTING SCENE, SAMPLE IMAGE | SHOOTING CONDITIONS | | | | | | | IMAGE CORRECTING CONDITIONS | | | | | | FILE FORMAT (NORMAL FORMAT, or PLURAL IMAGE FORMAT) |
|---|---|---|---|---|---|---|---|---|---|---|---|---|---|---|
| | EV SHIFT | STROBE | WHITE BALANCE | ISO SENSITIVITY | EXPOSURE METERING | FOCUS MODE | AF AREA | ... | FILTER | COLOR ENHANCE | SHARPNESS | COLOR SATURATION | CONTRAST | ... | |
| PORTRAIT | ±0 | AUTO | AUTO | AUTO | MULTI | AF | MULTI | ... | NO/OFF | SKIN TONE ENHANCE | SOFT (-1) | STANDARD (0) | STANDARD (0) | ... | NORMAL FORMAT |
| SCENERY | ±0 | OFF | AUTO | AUTO | MULTI | ∞ | FREE | ... | NO | BLUE ENHANCE | HARD (+1) | A LITTLE HIGH (+1) | A LITTLE HIGH (+1) | ... | PLURAL IMAGE FORMAT |
| PORTRAIT WITH SCENERY | ±0 | AUTO | AUTO | AUTO | MULTI | AF | MULTI | ... | NO | SKIN TONE ENHANCE | SOFT (-1) | STANDARD (0) | STANDARD (0) | ... | PLURAL IMAGE FORMAT |
| SUNDOWN | ±0 | OFF | DAILIGHT | AUTO | MULTI | ∞ | FREE | ... | RED ENHANCER | OFF | SOFT (-1) | A LITTLE HIGH (+1) | STANDARD (0) | ... | PLURAL IMAGE FORMAT |

FIG. 4

| SHOOTING SCENE, SAMPLE IMAGE | SHOOTING CONDITIONS | | | | | | | | IMAGE CORRECTING CONDITIONS | | | | | | FILE FORMAT (NORMAL FORMAT, or PLURAL IMAGE FORMAT) |
|---|---|---|---|---|---|---|---|---|---|---|---|---|---|---|---|
| | EV SHIFT | STROBE | WHITE BALANCE | ISO SENSITIVITY | EXPOSURE METERING | FOCUS MODE | AF AREA | ... | FILTER | COLOR ENHANCE | SHARPNESS | COLOR SATURATION | CONTRAST | ... | |
| PORTRAIT  | ±0 | AUTO | AUTO | AUTO | MULTI | AF | MULTI | .. | NO/OFF | SKIN TONE ENHANCE | SOFT (-1) | STANDARD (0) | STANDARD (0) | .. | NORMAL FORMAT |
| SCENERY  | ±0 | OFF | AUTO | AUTO | MULTI | ∞ | FREE | .. | NO | BLUE ENHANCE | HARD (+1) | A LITTLE HIGH (+1) | A LITTLE HIGH (+1) | .. | PLURAL IMAGE FORMAT |
| PORTRAIT WITH SCENERY 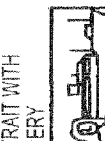 | ±0 | AUTO | AUTO | AUTO | MULTI | AF | MULTI | .. | NO | SKIN TONE ENHANCE | SOFT (-1) | STANDARD (0) | STANDARD (0) | .. | PLURAL IMAGE FORMAT |
| SUNDOWN  | ±0 | OFF | DAYLIGHT | AUTO | MULTI | ∞ | FREE | .. | RED ENHANCER | OFF | SOFT (-1) | A LITTLE HIGH (+1) | STANDARD (0) | .. | PLURAL IMAGE FORMAT |

| | | | | | | | | | | | |
|---|---|---|---|---|---|---|---|---|---|---|---|
| FLOWER | ±0 | AUTO | AUTO | AUTO | MULTI | MACRO SPOT | ... | NO | OFF | SOFT (-1) | A LITTLE LOW (-1) | A LITTLE HIGH (+1) | ... | NORMAL FORMAT |
| COLLECTION | ±0 | AUTO | SPECIAL EFFECT LIGHTING | AUTO | MULTI | AF SPOT | ... | NO | OFF | STANDARD (0) | STANDARD (0) | STANDARD (0) | ... | PLURAL IMAGE FORMAT |
| NIGHT SCENE PORTRAIT | ±0 | RED EYE REDUCTION | AUTO | AUTO | MULTI | AF SPOT | ... | NO | OFF | STANDARD (0) | STANDARD (0) | STANDARD (0) | ... | PLURAL IMAGE FORMAT |
| CANDLE | ±1 | LIGHTING/ OFF | DAYLIGHT | AUTO | MULTI | AF SPOT | ... | RED ENHANCER | OFF | SOFT (-1) | A LITTLE HIGH (+1) | A LITTLE LOW (-1) | ... | PLURAL IMAGE FORMAT |
| BUSINESS CARD | ±1 | OFF | AUTO | AUTO | MULTI | MACRO SPOT | ... | NO | OFF | HARD (+1) | STANDARD (0) | A LITTLE HIGH (+1) | ... | PLURAL IMAGE FORMAT |

FIG. 7

| SHOOTING MODE (SHOOTING SCENE) | SHOOTING OPERATION | PRODUCED IMAGE | |
|---|---|---|---|
| | | MAIN IMAGE | SUB-IMAGE |
| BRACKET SHOOTING | BRACKETING | IMAGE AT INTERMEDIATE STAGE | IMAGES AT OTHER STAGES |
| CONTINUOUS SHOOTING | PLURAL TIMES | FIRST IMAGE | SECOND AND THEREAFTER IMAGE |
| (SCENERY) | NORMAL | NORMAL IMAGE | PANORAMA IMAGE |
| (PORTRAIT WITH SCENERY) | NORMAL | NORMAL IMAGE | PANORAMA IMAGE |
| (SUNDOWN) | EXPOSURE BRACKETING | IMAGE AT INTERMEDIATE STAGE | IMAGES AT OTHER STAGES |
| (COLLECTION) | NORMAL | NORMAL IMAGE | IMAGE OF SPECIFIC SIZE |
| (NIGHT SCENE PORTRAIT) | EXPOSURE BRACKETING | IMAGE AT INTERMEDIATE STAGE | IMAGES AT OTHER STAGES |
| (CANDLE) | STROBE LIGHTING /STROBE OFF | COMBINED IMAGE | IMAGE WITH STROBE LIGHTING |
| (BUSINESS CARD) | NORMAL | SQUARE SHAPED IMAGE | ORIGINAL IMAGE, CORRECTED IMAGE |

IMAGE PICK-UP APPARATUS, METHOD OF PRODUCING FILE OF OBTAINED IMAGE, AND RECORDING MEDIUM

BACKGROUND OF THE INVENTION

1. Field of the Invention

The present invention relates to an image pick-up apparatus, a method of producing an image file of obtained images, and recording medium.

2. Description of the Related Art

In general, when image files of picked-up images are produced in conventional image pick-up apparatuses, image files are produced and recorded, using a format conforming with the Camera File System (Design Rule Camera File System, herein after "DCF") and Exif (Exchangeable Image Format for Digital Camera) used in combination with DCF.

Various technical improvements have been made and proposed to a process of producing files of images. For example, a technique is proposed by Japanese Unexamined Patent No. 2000-261756 A, in which main image data, non-compressed sub-image data and compressed sub-image data are produced in a shooting operation, and then a size of the main image data is judged. When the size of the main image data is smaller than a predetermined value, that is, when the main image data is not of a high resolution, a file including the main image data and compressed image data is produced, whereby a file size of the produced file is reduced. In the above technique, the main image data corresponds to normal pick-up image data, and the sub-image data corresponds to small image data subjected to a reduction process.

However, the conventional technique of producing image files has been made on the assumption that only main image data and sub-image data (thumb image data) are included in the same file with respect to a single image. Therefore, with respect plural image produced in a continuous shooting operation, plural number of files are produced in accordance with the number of the produced images, resulting in yielding troublesome problems in managing and editing the obtained images.

SUMMARY OF THE INVENTION

According to one aspect of the invention, there is provided an image pick-up apparatus, in which plural sorts of shooting modes are prepared, and which comprises an image pick-up unit for shooting an object to obtain an image, a setting unit for selecting and setting one of the plural sorts of shooting modes, a recording unit for recording the plural sorts of shooting modes each associated with one of a first file format and a second file format, wherein the first file format is used for an image file of a single image and the second file format is used for an image file of plural images, when the image file of images obtained in the shooting modes is produced, and a controlling unit for controlling the image pick-up unit to shoot an object to obtain an image in the shooting mode set by the setting unit, and for producing an image file of the image obtained by the image pick-up unit under the control, which image file has one or the first image format and second image format corresponding to the shooting mode set by the setting unit.

According to another aspect of the invention, there is provided a method of producing an image file in an apparatus, in which plural sorts of shooting modes are prepared, and which has an image pick-up unit for shooting an object to obtain an image, and a memory recording the plural sorts of shooting modes each associated with one of a first file format and a second file format, wherein the first file format is used for an image file of a single image and the second file format is used for an image file of plural images, when the image file of images obtained in the shooting modes is produced, the method which comprises a step of selecting and setting one of the plural sorts of shooting modes recorded in the memory in response to an external operation, and a step of controlling the image pick-up unit to shoot an object to obtain an image in the selected and set shooting mode, and for producing an image file of the image obtained by the image pick-up unit under the control, which image file has one of the first image format and second image format corresponding to the selected and set shooting mode.

According to other aspect of the invention, there is provided a computer readable recording medium to be mounted on an apparatus, in which plural sorts of shooting modes are prepared, and which has a personal computer, an image pick-up unit for shooting an object to obtain an image, and a memory recording the plural sorts of shooting modes each associated with one of a first file format and a second file format, wherein the first file format is used for an image file of a single image and the second file format is used for an image file of plural images, when the image file of images obtained in the shooting modes is produced, the recording medium recording a computer program, when executed by the computer, making the personal computer function as means which comprises setting means for selecting and setting one of the plural sorts of shooting modes recorded in the memory in response to an external operation, and control means for controlling the image pick-up unit to shoot an object to obtain an image in the shooting mode selected and set from the plural shooting modes by the setting means, and for producing an image file of the image obtained by the image pick-up unit under the control, which image file has one of the first image format and second image format corresponding to the shooting mode selected and set by the setting means.

BRIEF DESCRIPTION OF THE DRAWINGS

FIG. 4 is a view schematically showing a structure of best shot data.

FIG. 5 is a view schematically showing a structure of best shot data.

FIG. 7 is a view showing relationship between shooting operations corresponding to specific shooting modes and shooting scenes and images produced in the shooting operations.

DETAILED DESCRIPTION OF THE PREFERRED EMBODIMENTS

Figure 1A:
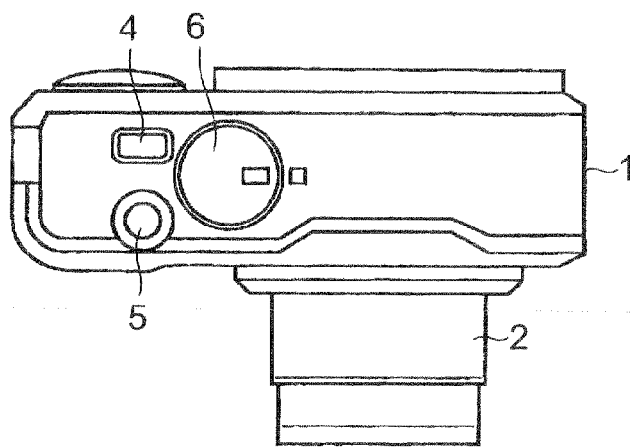
FIG. 1A is a top view of a digital camera according to an embodiment of the invention.
Figure 1B:
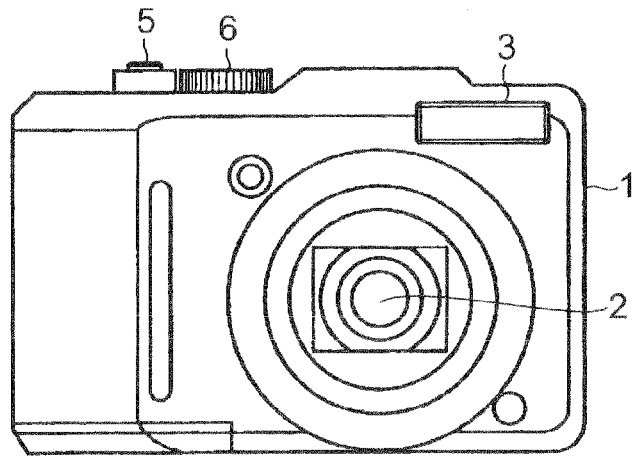
FIG. 1B is a front view of the digital camera.
Figure 1C:
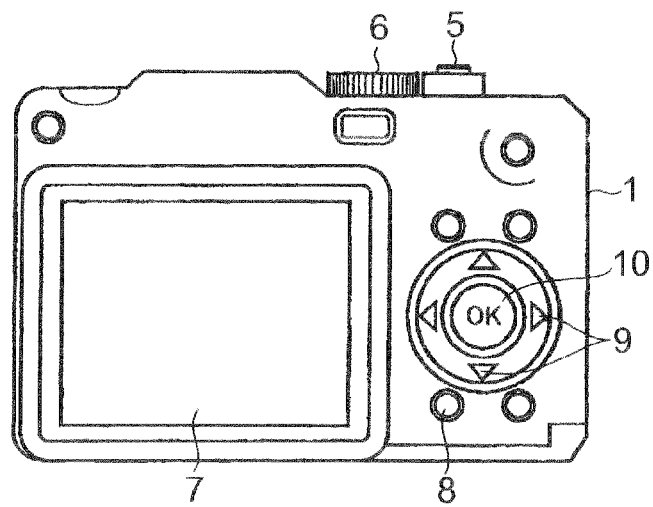
FIG. 1C is a rear view of the digital camera.

Now, embodiments of an image pick-up apparatus according to the present invention will be described in detail with reference to the accompanying drawings. FIGS. 1A, 1B and 1C are views illustrating an external appearance of the image pick-up apparatus (digital camera) of the invention. FIG. 1A is a top view of the digital camera. FIG. 1B is a front view of the digital camera, and FIG. 1C is a rear view of the digital camera.

As shown in FIGS. 1A and 1B, the digital camera is provided with an image pick-up lens 2 and a strobe light emitting unit 3 on the front face of its camera body 1. Further, the digital camera is provided with a power switch 4, release button 5 and shooting mode dial 6 on the top of its camera body 1, as shown in FIGS. 1A and 1B. LCD monitor 7, a menu key 8, cursor key 9, and an accept key (OK key) 10 are provided on the rear face of the camera body 1, as shown in FIG. 1C. The shooting mode dial 6 is used by a user to select one of plural shooting modes and also used to switch an operation mode from the shooting mode to a reproducing mode for reproducing a recorded image and vice versa.

Figure 2:
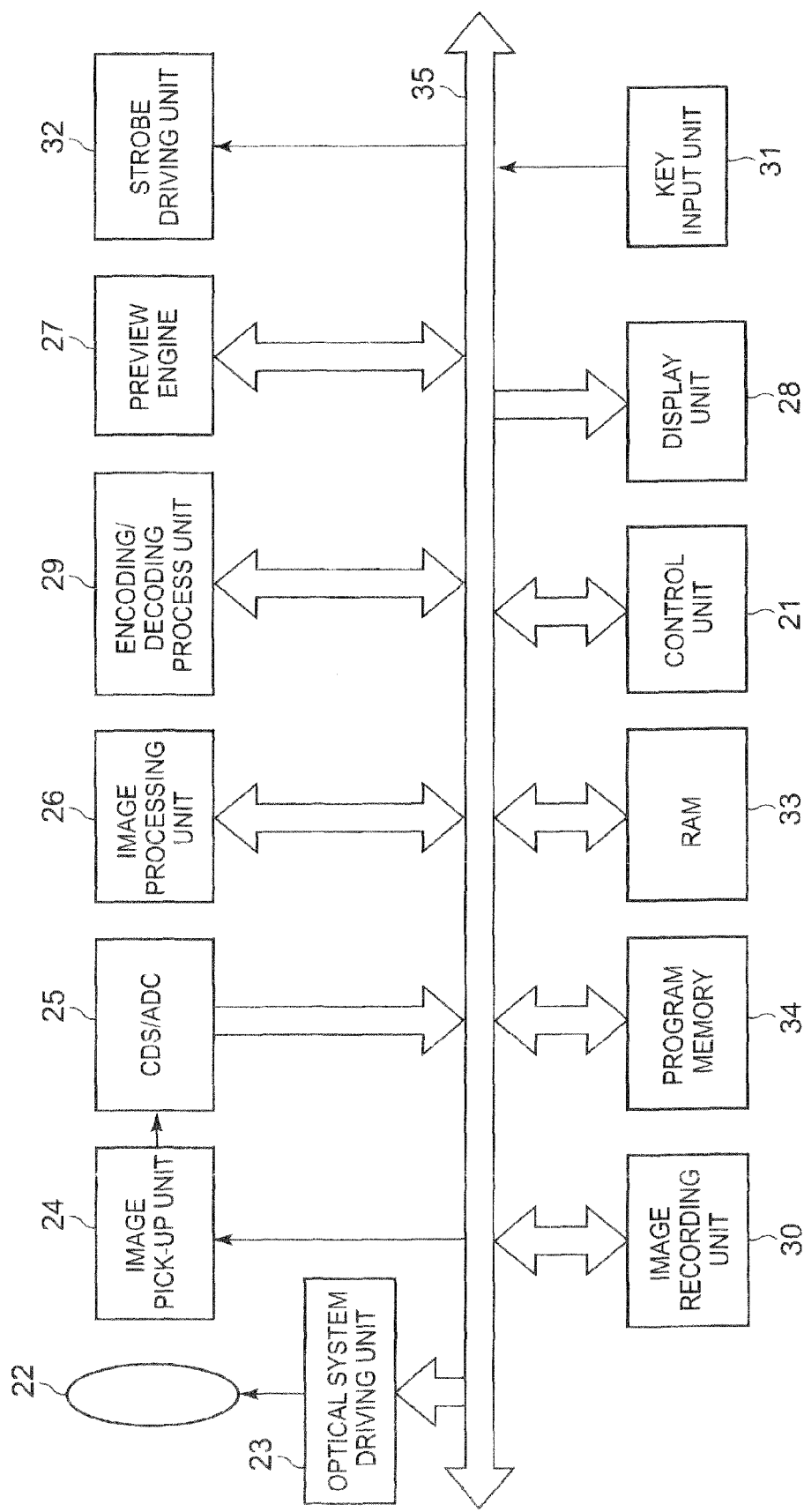
FIG. 2 is a block diagram showing an electric configuration of the digital camera.

FIG. 2 is a block diagram showing an electric configuration of the digital camera. The digital camera has a control unit 21 including one chip micro computer. The control unit 21 controls operation of whole system of the digital camera and also operation of various units connected thereto. In FIG. 2, a lens block 22 is a lens unit which includes an optical system having the image pick-up lens 2 and an optical system member having an aperture mechanism. Further, the lens block 22 includes a driving motor (not shown) for driving the optical system and an actuator (not shown) for making the aperture mechanism open or close. An optical system driving unit 23 drives the driving motor and the actuator in accordance with an instruction sent from the control unit 21, thereby effecting a focus adjustment and aperture adjustment.

The image pick-up unit 24 comprises an image sensor such as CMOS, etc., which is disposed on an optical axis of the image pick-up lens 2. The image pick-up unit 24 outputs an analog image pick-up signal corresponding to an optical image of an object. An analog processing unit 25 comprises CDS, an automatic gain control amplifier (AGC), and A/D converter (ADC), wherein CDS receives the analog image pick-up signal from the image pick-up unit 24 and performs a correlated double sampling process on the received signal to reduce noise components of the analog image pick-up signal, AGC amplifies the image pick-up signal with noise components reduced, and ADC converts the analog image pick-up signal into a digital image pick-up signal.

As described above, the output signal of the image pick-up unit 24 is converted into the digital image signal. The digital image signal is supplied to an image processing unit 26 to be subjected to various image processes. The digital image signal is reduced in size by a preview engine 27 and supplied to a display unit 28. The display unit 28 comprises LCD monitor 7 and a driving circuit, and displays a through image on LCD monitor based on the supplied digital image signal.

A signal that is processed by the image processing unit 26 in a shooting operation is subjected to a compression/encoding process by an encoding/decoding process unit 29. Then the signal is formed as an image file of a file format and recorded in an image recording unit 30, as will be described later. Meanwhile, in an image reproducing operation, the image file is read from the image recording unit 30 and main image data or main image data and sub-image data included in the image file are decoded by the encoding/decoding process unit 29 and displayed on LCD monitor 7. The image recording unit 30 comprises a memory card, which is detachably installed into the camera body 1 and is connected to the control unit 21 through a card interface (not shown).

The preview engine 27 generates the through image and also displays on LCD monitor 7 an image that is recoded in the image recording unit 30 immediately after a shooting operation has been performed. A key input unit 31 comprises the power switch 4, release button 5, shooting mode dial 6, menu key 8, cursor key 9, an OK key 10. A strobe driving unit 32 comprises a light emitting tube such as a xenon discharge tube, mounted in the strode light emitting unit 3, a condenser for light emission, a charging circuit, and a driving circuit for driving the light emitting tube. Upon receipt of an instruction form the control unit 21, the strobe driving unit 32 drives the light emitting tube to flash a light.

The control unit 21 is connected with RAM 33 and a program memory 34 through a bus line 35, wherein RAM 33 temporarily stores work data and intermediate files and the program memory 34 serves as recording means of the present invention.

Figure 3:
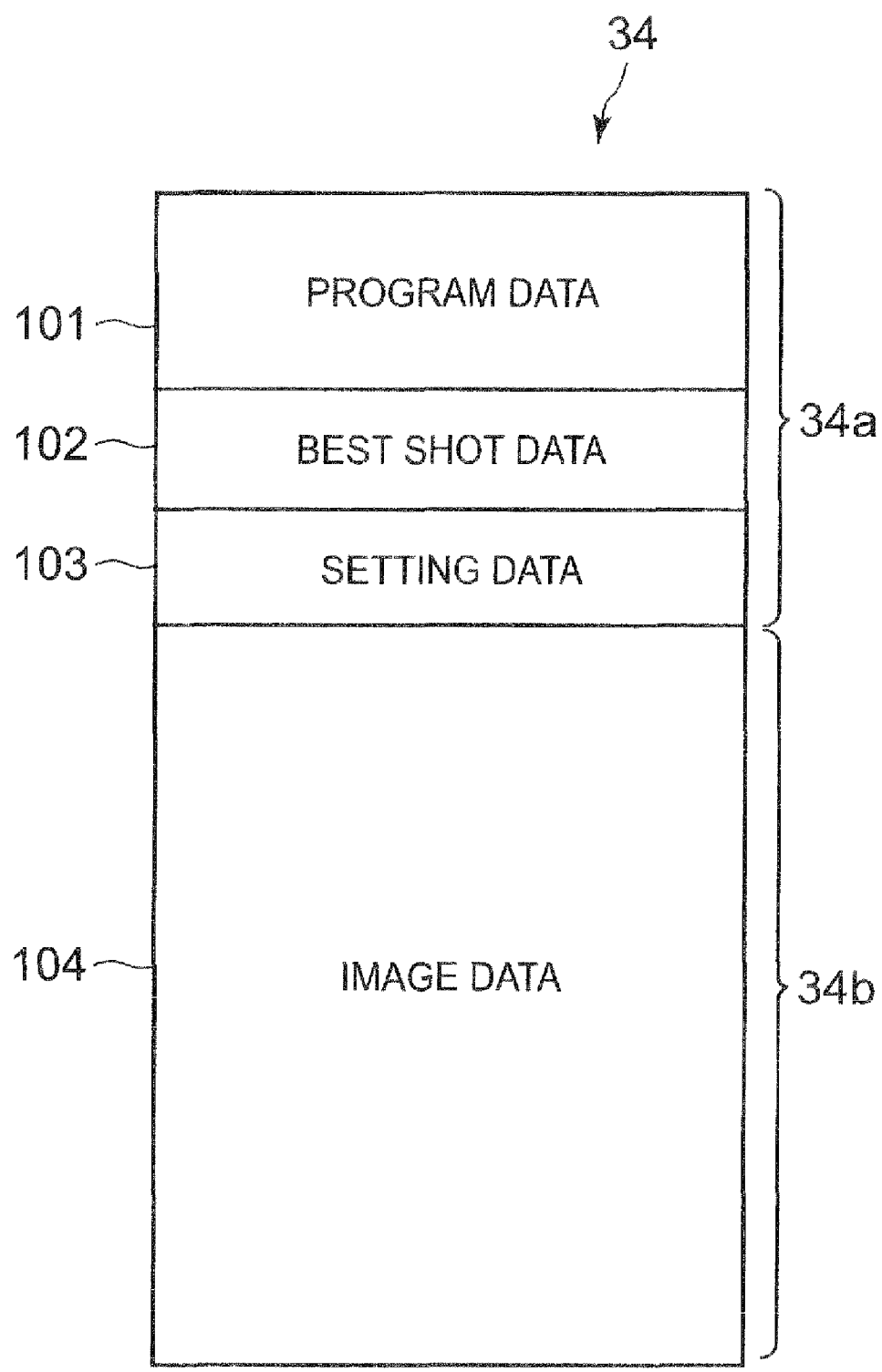
FIG. 3 is view schematically showing data stored in a program memory.

The program memory 34 comprises a re-writable non-volatile memory, in which a system area 34a for storing so called firmware and an image data recording area 34b are secured as shown in FIG. 3. In the system area 34a are stored program data memory 101, best shot data memory 102, and setting data memory 103. In the image data recording area 34b is recorded as needed image data 104 that is shot and compressed when no memory card is installed in the camera body 1.

The program data memory 101 contains various sorts of control programs necessary for the control unit 21 to control operations of various units and to perform data processes. In the control programs are included programs executed by the control unit 21 to perform AF control, AE control and AWB control, and program executed by the control unit 21 to function as setting means, image file producing means and mode selection controlling means, when performing processes in various shooting modes, for example, performing processes in accordance with a flow chart to be described later, and various sorts of data including program AE data forming a program chart indicating combinations of aperture values (F values) and shutter speeds corresponding to exposure values (EV) in the AE control operation.

The setting data memory 103 contains various sorts of setting data relating to operation of the digital camera, which can be rewritten as needed. The setting data includes data set by the user and data automatically set, such as information relating to the currently set shooting mode.

The digital camera according to the embodiment has shooting modes such as a normal shooting mode, a bracket shooting mode, a continuous shooting mode, and a best shot mode. The normal shooting mode is prepared for shooting normal still images. The bracket shooting mode is prepared for performing a bracketing shooting operation. In the bracket shooting mode, the shooting operations is performed predetermined number of times under intergrading shooting conditions in response to one shooting instruction from the release button 5. The continuous shooting mode is prepared for continuously performing the shooting operations predetermined number of times while the release button 5 is kept pressed. In the bracket mode, an exposure time, white balance, and shutter speed may be chosen as the intergrading shooting conditions, and may be recorded in the setting data memory 103 together with other setting information. The number of shooting operations to be performed in the continuous shooting mode may be set and recorded in the setting data memory 103 together with other setting information.

The best shot mode allows the user to select and set an appropriate shooting mode from a number of shooting modes that are previously prepared with respect to various objects, shooting purposes, shooting backgrounds, shooting surroundings, etc. (shooting scenes).

Further, each best shot mode displays a sample image representing a shooting scene that corresponds to a specific object to be shot and/or a shooting purpose or displays a sample image representing similar a shooting scene, thereby allowing the user to select one of the sample images, automatically setting shooting conditions and image correcting conditions corresponding to his or her selecting sample image.

Data used in the best shot mode is recorded in the best shot data memory 102 of the system area 34*a*.

FIG. 4 and FIG. 5 are views showing sample data of the best shot data memory 102. The best shot data memory 102 contains files (plural shooting modes) of plural shooting scenes selectable in the best shot mode, sample images obtained in shooting operation performed when respective shooting scenes are selected, shooting conditions and image correcting conditions corresponding respectively to shooting scenes, and file formats of data.

The shooting conditions consist of shooting parameters to be set at shooting operation, and the shooting parameters relate to EV shift value, Strobe, White Balance, ISO Sensitivity, Exposure Metering, Focus Mode, AF Area, etc, as shown in FIGS. 4 and 5. The image correcting conditions are parameters indicating corrections to be made to a shot image, which parameters relate to filter (color filter), color enhance, sharpness, color saturation, contrast, etc.

The file format is a format of an image file, which is produced when an image obtained by the shooting operation is recorded in the image recording unit 30. The file format is one of a normal format and a plural-image format. The normal format is a file format in conformity with DCF (Design rule for Camera File system), and is an image file format (first format in the present invention), in which a single image (including a thumbnail image) is stored. The plural-image format is an extended DCF file format, and is an image file format (second format in the present invention), in which plural images associated with each other are stored as main image data or one or plural pieces of sub-image data to be separately reproduced.

Although not shown in FIGS. 4 and 5, the best shot data memory 102 includes character information or description of effects obtained when the selected shooting scene is shot, guidance of shooting operation, and other advices. The character information or the description is displayed together with the sample image.

Figure 6:
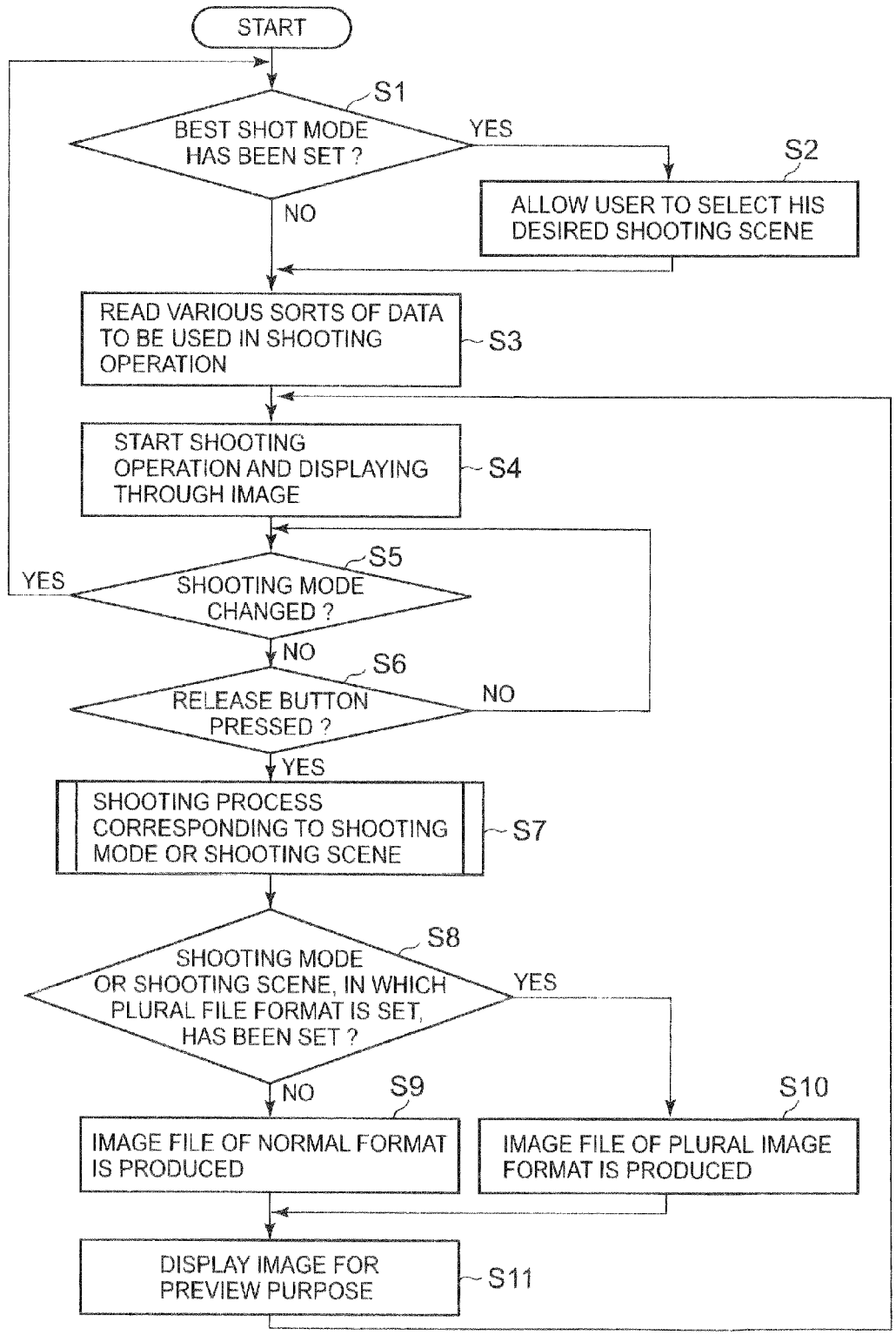
FIG. 6 is a flow chart of a process performed in a shooting operation.

A process will be described with reference to a flow chart of FIG. 6, which process is performed by the control unit 21 when one of the plural shooting modes is set in the digital camera according to the invention.

When the user operates the shooting mode dial 6 to set one of the plural shooting modes, the control unit 21 judges at step S1 whether or not the best shot mode has been set.

When the best shot mode has been set (YES at step S1), the control unit 21 reads data from the best shot data memory 102, and displays on LCD monitor 7 a predetermined scene selection screen including the sample images of shooting scenes and detailed descriptions, thereby allowing the user to select his or her desired shooting scene with respect to a sort of object, shooting surroundings, and a shooting purpose at step S2.

The control unit 21 reads from the program memory 9 various sorts of data to be used in the shooting operation at step S3. When the best shot mode has not been set (NO at step S1), the control unit 21 immediately reads from the program memory 9 various sorts of data to be used in the shooting operation at step S3.

Then, the control unit 21 starts operation in accordance with a program relating to a shooting process, stored in the program memory 9, and starts displaying on LCD monitor 7 through images based on images that are periodically shot by the image pick-up unit 3 (step S4). At the same time, the control unit 21 starts AE process and AF process. Thereafter, in a shooting-operation standby state with a through image displayed, the control unit 21 judges at step S5 whether or not the shooting mode has been changed by the user operating the shooting mode dial, and further judges at step S6 whether or not the release button 5 has been pressed. When the shooting mode has been changed (YES at step S5), the control unit 21 returns to step S1.

When the release button has been pressed at a time during the shooting-operation standby state (YES at step S6), the control unit 21 performs a shooting operation corresponding to the previously selected shooting scene or performs a shooting operation in accordance with the shooting mode set at such time, thereby obtaining one or plural images and temporarily storing the obtained images in RAM 33 at step S7.

When the shooting mode of the normal mode is set, a normal shooting operation is performed in response to a pressing operation of the release button with AE control performed in accordance with brightness of the object, whereby a pick-up image is obtained (produced). When the shooting scene selected in the best shot mode is a shooting scene in which the normal format is set as the file format in the best shot data memory 102 (that is, when the shooting scene of "Portrait" or "Flower" is selected in the best shot data memory 102 in FIG. 4 and FIG. 5), the shooting conditions and image correcting conditions corresponding to the selected shooting scene are read from the best shot data memory 102, and the shooting operation is performed using these shooting conditions and image correcting conditions, whereby a pick-up image is obtained (produced).

When a shooting mode is set, in which a continuous shooting operation is required (that is, when the shooting mode has been set, such as the bracket shooting mode, continuous shooting mode, and a shooting mode corresponding to the specific shooting scene in which the plural-image formats are set as the file format), an appropriate shooting operation is performed, whereby a main image and sub-image are obtained (produced), as will be described later. More specifically, when the bracket shooting mode is set, the bracketing shooting operation is performed under the intergrading shooting conditions that are previously selected, whereby a pick-up image is obtained as a main image at an intermediate stage and other pick-up images are obtained as sub-images at other stages, as shown in FIG. 7. When the continuous shooting mode has been set, the continuous shooting operation is performed as described above. The main image is obtained in the first shooting operation and plural pick-up images are obtained in the second shooting operation and thereafter as sub-images.

When the shooting scene of "Scenery" or "Portrait with Scenery" is selected in the best shot mode, a shooting operation is performed under the shooting conditions and image correcting condition corresponding to the selected shooting scene, whereby a pick-up image is obtained (produced) as a main image. A panorama image of a panorama size, that is, an image having a not even horizontal to vertical ratio is produced from the pick-up image, whereby a sub-image is obtained.

When the shooting scene of "Sundown" or "Night Scenery Portrait" is selected, the bracketing shooting operation is performed under the intergrading conditions, in which EV value is intergraded with the basis of the corresponding image correcting conditions, whereby a pick-up image is obtained as a main image at an intermediate stage and plural pick-up images are obtained as sub-images at other stages.

When the shooting scene of "Collection" is selected, a shooting operation is performed under the shooting conditions and image correcting conditions corresponding to the selected shooting scene, whereby a pick-up image is obtained (produced) as a main image. Images having plural sizes (plural sizes appropriate for posting on the Internet), which are different in data volume are separately produced from the pick-up image as sub-images.

When the shooting scene of "Candle light Portrait" is selected, a shooting operation is performed using the strobe light and another shooting operation is performed using no strobe light, whereby two sorts of pick-up images are produced. A combining process is performed to combine the two sorts of pick-up images together at a predetermined ratio, thereby securing an appropriate brightness of a combined image. The combined image is obtained as a main image. The two sorts of pick-up images which have not been subjected to the combining process, are obtained as sub-images.

When the shooting scene of "Business Cards and Documents" is selected, the normal shooting operation is performed under the shooting conditions corresponding to the selected shooting scene, whereby a pick-up image (original image) is obtained (produced). A process is performed on the original image to confirm a rectangular area of an object, which area corresponds to a business card, and further a normalizing process is performed to normalize the confirmed rectangular area of an object to a square shape, whereby a square shaped image is obtained as a main image. The original image (pick-up image) is corrected in accordance with the image correcting conditions corresponding to the selected shooting scene, and the corrected image and original image are obtained as sub-images.

When the shooting scene of the normal shooting mode is selected, and/or when she shooting scene, for which the normal format is selectee as its file format, is selected (that is, when the shooting scene of "Portrait" and/or "Flower" is selected in FIGS. 4 and 5) (NO at step S8), the pick-up images obtained and temporarily stored in RAM 33 in any one of the above shooting processes are compressed and encoded by the encoding/decoding process unit 29. Based on the encoded image data an image file of the normal format described above is produced. The image file is recorded in the image recording unit (memory card) 30 at step S9.

When the shooting mode or shooting scene is set, in which the continuous shooting operation is required (YES at step S8), the main image obtained and temporarily stored in RAM 33 and one and more sub-images are compressed and encoded by the encoding/decoding process unit 29. Based on plural pieces of encoded image data (main image data and sub-image data), an image file 200 of the plural-image format is produced. The image file is recorded in the image recording unit (memory card) 30 at step S10.

Figure 8:
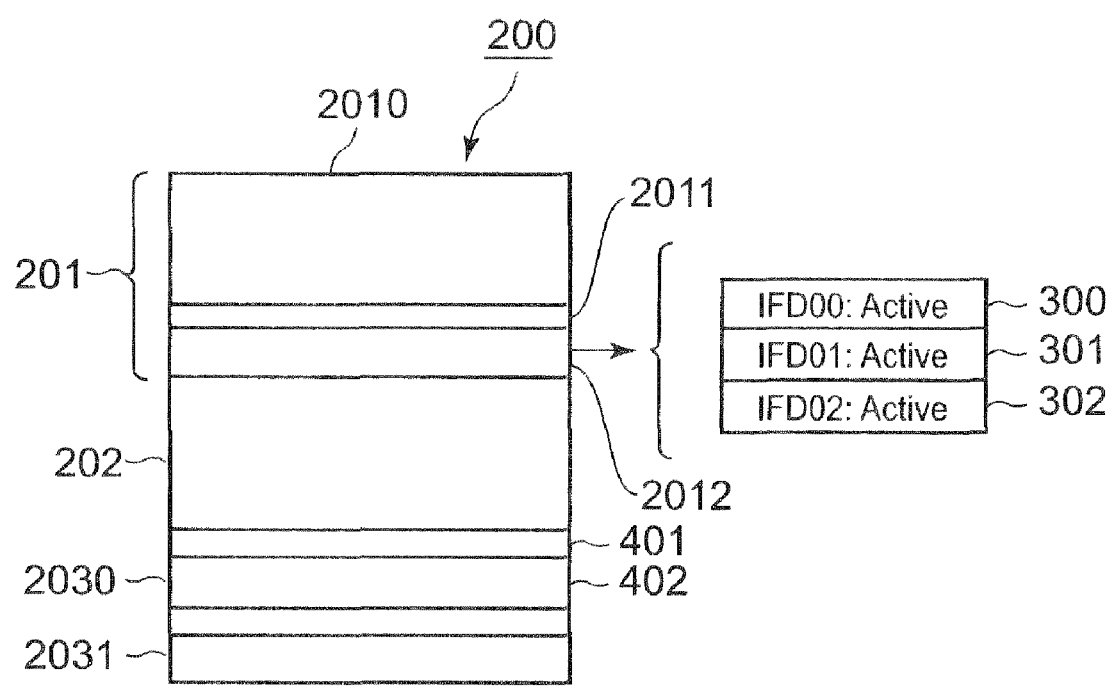
FIG. 8 is a view showing a file structure of an image file of a plural-image format.

FIG. 8 is a view schematically showing a structure of the image file 200 of the plural-image format produced at step S10. An example of the file structure is shown in FIG. 8, in which three images (two sub-images included) are stored. The image file 200 of the plural-image format conforms to DCF (Exif format), but the image file 200 is different from DCF (Exif format) in that the main image header includes a management area of sub-image data and that one and more sub-image data associated with the main image data are stored therein.

More specifically, the image file 200 of the plural-image format consists of the main header 201, a main image data setting area 202, and sub-image data setting areas 2030, 2031 and 2032. Further, the main image header 201 consists of a fundamental information setting area 2010, a thumbnail image data setting area 2011, and an image index IFD 2012. In the fundamental information setting area 2010 are set Exif essential tags including a manufacturer's name and model name of an image input device conforming to DCF (Exif format), production data and time of original image data, production date and time of digital data, Interoperability index, and version, etc. Thumbnail image data of the main image data is set in the thumbnail image data setting area 2011. Information for managing the number of main image data (one sheet) and the number of sub-image data (two sheets), and image index IFD tags are included, and further the number of sub-image identification IFD setting areas 300, 301 and 302 are written in the image index IFD 2012.

The sub-image identification IFD setting areas 300, 301 and 302 each are provided with areas for recording the sorts of sub-images, sub-image data offset, sub-image unique ID, dependent sub-image identification IFD, and Offset of Next IFD, respectively. During production of the image file 200, IFD00, IFD01 and IFD02 of the image Index IFD 2012 are set to "Non-use", before sub-image data to be managed by the image index IFD 2012 is stored in the image file 200, and IFD00, IFD01 and IFD02 of the image index IFD 2012 turn to "Active" at the time when the sub-image data has been stored in the image file 200. As more images are to be stored in the image file 200, the number of the sub-image data setting areas and sub-image identification IFD setting areas increase. In other words, in the case four images are stored in the image file 200, the sub-image data setting areas, and sub-image identification IFD setting areas each are secured for four sheets of images.

The main image data is written in the main image data setting area 202. Thumbnail image data of sub-images, attribute information of the sub-images, a sub-image header 401 and sub-image data setting area 402 are written in each of the sub-image data setting areas 2030-2032. In the sub-image header 401 is set Exif essential tag data of the sub-image data itself. Since the thumbnail image data is written in the sub-image header 401, it is presupposed that the sub-image data is larger in size than the thumbnail image data (for example, 120 by 160).

The control unit 21 produces an image file of the format corresponding to the shooting mode or shooting scene as described above, and records one or plural pick-up images obtained in the shooting operation. Then, the control unit 21 displays the recorded images for a predetermined period for a preview purpose at step 211, and returns to step 24 to perform the processes at steps S4 to S11, again. In the case the image file of the plural-image format is produced in the shooting operation, the main image is displayed for the predetermined period for the preview purpose.

In the embodiment of the digital camera, when the shooting mode is set, in which plural images are recorded in the shooting operation, an image file of the plural-image format is produced, and plural images obtained in the shooting operation are recorded therein in a lump. Therefore, plural sheets of images associated with each other can be treated in a lump, allowing easy management of the obtained images.

In the embodiment, the bracket shooting mode has been described, in which the number of times of shooting operations to be performed in said mode is fixed, or the number of times of shooting conditions to be changed in said mode is fixed, and the continuous shooting mode, in which the number of times of shooting operations to be performed is fixed has been described, but an arrangement may be made to the embodiment such that the user is allowed to change the number of times of shooting operations to be performed according to need. The specific shooting scene selected in the best shot mode has been described, in which the image to be recorded as the sub-image is previously determined in the shooting operation, but an arrangement may be made such that the user is allowed to change the image to be recorded as the sub-image with respect to every specific shooting scene.

Further, an arrangement may be made such that the user is allowed to set (change) the file formal for a specific shooting scene to be set in the best shot data memory 102 according to need with respect to every sheering scene. In this case, only when the file format is set to the plural-image format, plural images are produced in the shooting operation and further an image file of the plural-image format is produced to store such plural images, and when the file format is set to the normal format, an image file of the normal format is produced to store only an image corresponding to the main image.

The embodiment of the digital camera has been described, in which the bracket mode and continuous shooting mode are prepared as the shooting mode for producing plural images and recording the plural images produced and associated with each other, but the shooting mode for producing and recording plural images in the shooting operation is not limited to those described herein. The panorama shooting mode for combining plural images obtained in the continuous shooting operation to produce a panorama image may be set as the shooting mode for recording the plural images associated with each other. In this case, an image file of the plural-image format is produced, in which the produced panorama image is stored as the main image and plural pick-up images combined to produce the panorama image are stored as the sub-images.

Further, for a purpose of performing a shooting operation in the dark to obtain a pick-up image with less noise, a separate exposure mode with a low ISO sensitivity set may be employed, in which shooting operations are performed several times each with a short exposure time and pick-up images obtained each time are combined together to produce one pick-up image as if the image is obtained with a suitable exposure time. In this case, an image file of the plural-image format is produced, in which the combined image is stored as the main image and the pick-up images obtained each time are stored as the sub-images.

Furthermore, a shooting scene for performing a shooting operation similar to those performed in the panorama shooting mode and/or the separate exposure mode may be included in the shooting scenes selectable in the best shot mode. The shooting operation is simply one example, which is performed when a specific shooting scene that produces and records plural images in the shooting operation is selected from the shooting scenes described in the present embodiment. For example, when the shooting scene of "Business Card and Documents" is selected, an arrangement may be made such that the rectangular area of an object in the obtained image is subjected to the normalizing process and then the rectangular area of an object corresponding to the business card is cut out from the square-shaped image and that the cut out image is obtained as the main image and the square-shaped image is converted to binary data.

Shooting scenes, in which the same shooting conditions and image correcting conditions are set but different file formats are set, may be included in the shooting scenes selectable in the best shot mode. That is, in the shooting scenes selectable in the best shot mode may be included the shooting scenes, in which the same object, the same shooting surroundings, and the same shooting purpose are set, but which are different in number of images to be recorded therein, in other words, one shooting scene in which one sheet of image is recorded and other in which plural sheets of images are recorded.

The invention which is applied to the digital camera has been described, but may be applied to any apparatus which is provided with a shooting operation mode that produces and records plural images in the shooting operation, such as mobile phones and image pick-up devices mounted on other mobile information devices.

What is claimed is:

1. An image pick-up apparatus having plural shooting modes, comprising:
   an image pick-up unit for shooting an object to obtain an image;
   a setting unit for selecting and setting one of the plural shooting modes;
   a recording unit for recording image files of images obtained in the plural shooting modes, each of the plural shooting modes being associated with one of a first file format and a second file format, wherein the first file format is used for an image file of a single image and the second file format is used for an image file of plural images; and
   a controlling unit for controlling the image pick-up unit to obtain at least one image in the shooting mode set by the setting unit, and for producing an image file including the at least one obtained image and having one of the first image format and second image format corresponding to the shooting mode set by the setting unit;
   wherein the second file format is a file format that sets one of plural images obtained by the image pick-up unit as a main image and sets at least one other image of the plural images as a sub-image, and that has a data structure in which the main image and the sub-image are distinguishable, and
   wherein the plural shooting modes include a plurality of shooting modes which are associated with the second file format, and which have respective image types as the main image.

2. The image pick-up apparatus according to claim 1, wherein a continuous shooting mode is included in the plurality of shooting modes associated with the second file format.

3. The image pick-up apparatus according to claim 2, wherein the continuous shooting mode includes a process of combining plural images obtained in the continuous shooting mode to produce an image.

4. The image pick-up apparatus according to claim 1, wherein a bracket shooting mode is included in the plurality of shooting modes associated with the second file format.

5. The image pick-up apparatus according to one of claims 1 and 2 to 4, wherein a mode which reproduces the image obtained by the image pick-up unit and performs a predetermined process on the reproduced image is included in the plurality of shooting modes associated with the second file format.

6. The image pick-up apparatus according to claim 5, wherein the predetermined process comprises a square-shape normalization process for confirming a rectangular area of an object in the image obtained by the image pick-up unit and normalizing the confirmed rectangular area of an object to a square shape.

7. The image pick-up apparatus according to claim 6, wherein the predetermined process includes a process of binarizing the normalized rectangular area of an object.

8. The image pick-up apparatus according to claim 1, wherein at least one of the image types indicates an order in which the main image is captured among the plural images.

9. The image pick-up apparatus according to claim 1, wherein at least one of the image types indicates that the main image remains the same.

10. A method of producing an image file in an apparatus having plural shooting modes, the apparatus including an image pick-up unit for shooting an object to obtain an image, and a memory for recording image files of images obtained in the plural shooting modes, each of the plural shooting modes being associated with one of a first file format and a second file format, wherein the first file format is used for an image file of a single image and the second file format is used for an image file of plural images, the method comprising:

selecting and setting one of the plural shooting modes in response to an external operation;

controlling the image pick-up unit to obtain at least one image in the selected and set shooting mode; and producing an image file including the at least one obtained image and having one of the first image format and second image format in accordance with the selected and set shooting mode;

wherein the second file format is a file format that sets one of plural images obtained by the image pick-up unit as a main image and sets at least one other image of the plural images as a sub-image, and that has a data structure in which the main image and the sub-image are distinguishable, and wherein the plural shooting modes include a plurality of shooting modes which are associated with the second file format, and which have respective image types as the main image.

11. A non-transitory computer readable recording medium having a computer program stored thereon that is executable by a computer of an apparatus having plural shooting modes, the apparatus including an image pick-up unit for shooting an object to obtain an image, and a memory for recording image files of images obtained in the plural shooting modes, each of the plural shooting modes being associated with one of a first file format and a second file format, wherein the first file format is used for an image file of a single image and the second file format is used for an image file of plural images, the program being executable by the computer to control the apparatus to perform functions comprising:

selecting and setting one of the plural shooting modes in response to an external operation;

controlling the image pick-up unit to obtain at least one image in the selected and set shooting mode; and producing an image file including the at least one obtained image and having one of the first image format and second image format in accordance with the selected and set shooting mode;

wherein the second file format is a file format that sets one of plural images obtained by the image pick-up unit as a main image and sets at least one other image of the plural images as a sub-image, and that has a data structure in which the main image and the sub-image are distinguishable, and wherein the plural shooting modes include a plurality of shooting modes which are associated with the second file format, and which have respective image types as the main image.

\* \* \* \* \*